United States Patent
Manadhata et al.

(10) Patent No.: US 10,878,102 B2
(45) Date of Patent: Dec. 29, 2020

(54) RISK SCORES FOR ENTITIES

(71) Applicant: EntIT Software LLC, Sunnyvale, CA (US)

(72) Inventors: Pratyusa K. Manadhata, Piscataway, NJ (US); Manish Marwah, Palo Alto, CA (US); Alexander Ulanov, Palo Alto, CA (US)

(73) Assignee: Micro Focus LLC, Santa Clara, CA (US)

( * ) Notice: Subject to any disclaimer, the term of this patent is extended or adjusted under 35 U.S.C. 154(b) by 285 days.

(21) Appl. No.: 15/596,041

(22) Filed: May 16, 2017

(65) Prior Publication Data

US 2018/0336353 A1 Nov. 22, 2018

(51) Int. Cl.
*G06F 21/57* (2013.01)
*H04L 29/06* (2006.01)
*G06Q 10/06* (2012.01)
*G06F 16/242* (2019.01)
*G06F 16/33* (2019.01)
*G06F 16/28* (2019.01)
*G06F 16/901* (2019.01)

(52) U.S. Cl.
CPC .......... *G06F 21/577* (2013.01); *G06F 16/244* (2019.01); *G06F 16/285* (2019.01); *G06F 16/3334* (2019.01); *G06F 16/9024* (2019.01); *G06Q 10/0635* (2013.01); *H04L 63/1416* (2013.01); *H04L 63/1425* (2013.01); *G06F 2221/2111* (2013.01); *G06F 2221/2137* (2013.01)

(58) Field of Classification Search
CPC .. G06F 21/577; G06F 16/285; G06F 16/3334; G06F 16/244; G06F 16/9024; G06F 21/62; G06Q 10/0635; H04L 63/1416; H04L 63/1433
See application file for complete search history.

(56) References Cited

U.S. PATENT DOCUMENTS 8,572,007 B1 * 10/2013 Manadhata .......... G06F 21/567
706/12
9,282,114 B1 3/2016 Dotan
(Continued)

FOREIGN PATENT DOCUMENTS

WO   WO-20160138067 A1   9/2016

OTHER PUBLICATIONS

Shashanka et al., User and Entity Behavior Analytics for Enterprise Security (Year: 2016).*
(Continued)

*Primary Examiner* — Mahfuzur Rahman
*Assistant Examiner* — Richard W Cruz-Franqui

(57) ABSTRACT

In some examples, a system receives anomaly scores regarding an entity from a plurality of detectors, produces a weighted anomaly score for the entity based on the anomaly scores and respective weights assigned to the plurality of detectors, the weights based on historical performance of the plurality of detectors, determines an impact based on a context of the entity, wherein the impact is indicative of an effect that the entity would have on a computing environment if the entity were to exhibit anomalous behavior, and computes a risk score for the entity based on the weighted anomaly score and the determined impact.

16 Claims, 4 Drawing Sheets

(56) References Cited

U.S. PATENT DOCUMENTS

| | | | |
|---|---|---|---|
| 9,324,119 B2 | 4/2016 | Singh | |
| 9,516,053 B1 | 12/2016 | Muddu | |
| 2005/0193281 A1 | 9/2005 | Ide | |
| 2006/0082463 A1* | 4/2006 | Sri-Jayantha | G01D 3/08 340/635 |
| 2008/0276319 A1* | 11/2008 | Rittermann | H04L 63/1425 726/23 |
| 2009/0150371 A1 | 6/2009 | Dasdan | |
| 2010/0229187 A1* | 9/2010 | Marwah | G06F 11/3058 719/318 |
| 2010/0251370 A1* | 9/2010 | Sun | G06F 21/554 726/23 |
| 2013/0289904 A1* | 10/2013 | Marwah | G01D 4/00 702/61 |
| 2014/0090056 A1* | 3/2014 | Manadhata | H04L 63/14 726/23 |
| 2014/0165198 A1* | 6/2014 | Altman | H04L 63/1408 726/23 |
| 2014/0189873 A1* | 7/2014 | Elder | H04L 63/1433 726/25 |
| 2014/0215053 A1* | 7/2014 | Marwah | H04L 12/28 709/224 |
| 2014/0223553 A1* | 8/2014 | Gupta | H04M 1/72572 726/22 |
| 2015/0215329 A1 | 7/2015 | Singla | |
| 2016/0021126 A1* | 1/2016 | Vasseur | H04L 63/1458 726/23 |
| 2016/0055242 A1* | 2/2016 | Bradic | G06F 16/958 707/728 |
| 2016/0142432 A1* | 5/2016 | Manadhata | H04L 63/14 726/25 |
| 2016/0217378 A1* | 7/2016 | Bellala | G06N 5/04 |
| 2016/0253495 A1 | 9/2016 | Kolacinski | |
| 2016/0306965 A1* | 10/2016 | Iyer | G06Q 10/105 |
| 2016/0359685 A1 | 12/2016 | Yadav | |
| 2016/0359686 A1* | 12/2016 | Parandehgheibi | H04L 45/74 |
| 2016/0359719 A1 | 12/2016 | Travostino | |
| 2017/0078322 A1* | 3/2017 | Seiver | G06F 21/577 |
| 2017/0302691 A1* | 10/2017 | Singh | H04L 63/1408 |
| 2017/0317932 A1* | 11/2017 | Paramasivam | H04L 67/02 |
| 2017/0324757 A1* | 11/2017 | Al-Shaer | H04L 63/1433 |
| 2017/0337376 A1* | 11/2017 | Reader | G06F 21/567 |
| 2018/0083995 A1* | 3/2018 | Sheth | H04L 63/1416 |
| 2018/0336353 A1* | 11/2018 | Manadhata | H04L 63/1425 |
| 2018/0337935 A1* | 11/2018 | Marwah | H04L 63/1425 |

OTHER PUBLICATIONS

NPL Search (Google Scholar) (Year: 2020).*
Avivah Litan, "Market Guide for User and Entity Behavior Analytics," Gartner, Sep. 22, 2015; 19 pages.
Bar-Yossef et al., Local Approximation of PageRank and Reverse PageRank, CIKM Oct. 2008 (10 pages).
Dong, B. et al.; GID: Graph-based Intrusion Detection on Massive Process Traces for Enterprise Security Systems; https://arxiv.org/pdf/1608.02639.pdf; Aug. 8, 2016; 11 pages.
ESG: Mcafee Next Generation Siem; https://www.mcafee.com/us/resources/reports/rp-esg-lab-validation-next-gen-siem.pdf; Apr. 2015; 23 pages.
Hassanzadeh, R.; Anomaly Detection in Online Social Networks: Using Datamining Techniques and Fuzzy Logic; http://eprints.qut.edu.au/78679/1/Reza_Hassanzadeh_Thesis.pdf; Nov. 2014; 225 pages.
https://nlp.stanford.edu/IRbook/html/htmledition/linearalgebrareview-1.html—Linear algebra review, 2008 (5 pages).
Manish Marwah et al., U.S. Appl. No. 15/596,042 entitled Anomalous Entity Determinations filed May 16, 2017 (44 pages).
Preempt Security; Preempt Emerges From Stealth with Behavioral Firewall; https://www.preempt.com/press/preempt-introduces-behavioral-firewall/; Jun. 13, 2016; 2 pages.
Ranshous, S. et al.; Anomaly Detection in Dynamic Networks:A Survey; https://repository.lib.ncsu.edu/bitstream/handle/1840.2/2575/anomaly_detection_survey.pdf?sequence=1 ; 2015; 27 pages.
Rogers, Ian, The Google PageRank Algorithm and How It Works dated on or before Apr. 8, 2017 (18 pages).
VASA Virtual Advisor to Security Analysts; Data Science Driven Behavioral Analytics; https://www.ranksoftwareinc.com/vasa; 2017; 2 pages.
Wikipedia, Degree (graph theory) last modified Nov. 24, 2016 (5 pages).
Wikipedia, HITS algorithm last modified Jul. 8, 2016 (7 pages).
Wikipedia, PageRank last modified Apr. 8, 2017 (28 pages).
Wikipedia, Parametric statistics last modified Dec. 8, 2016 (3 pages).
Wikipedia, Power law last modified Mar. 27, 2017 (18 pages).

* cited by examiner

RISK SCORES FOR ENTITIES

BACKGROUND

A computing environment can include a network of computers and other types of devices. Issues can arise in the computing environment due to behaviors of various entities. Monitoring can be performed to detect such issues, and to take action to address the issues.

BRIEF DESCRIPTION OF THE DRAWINGS

Some implementations are described with respect to the following figures.

Figure 1:
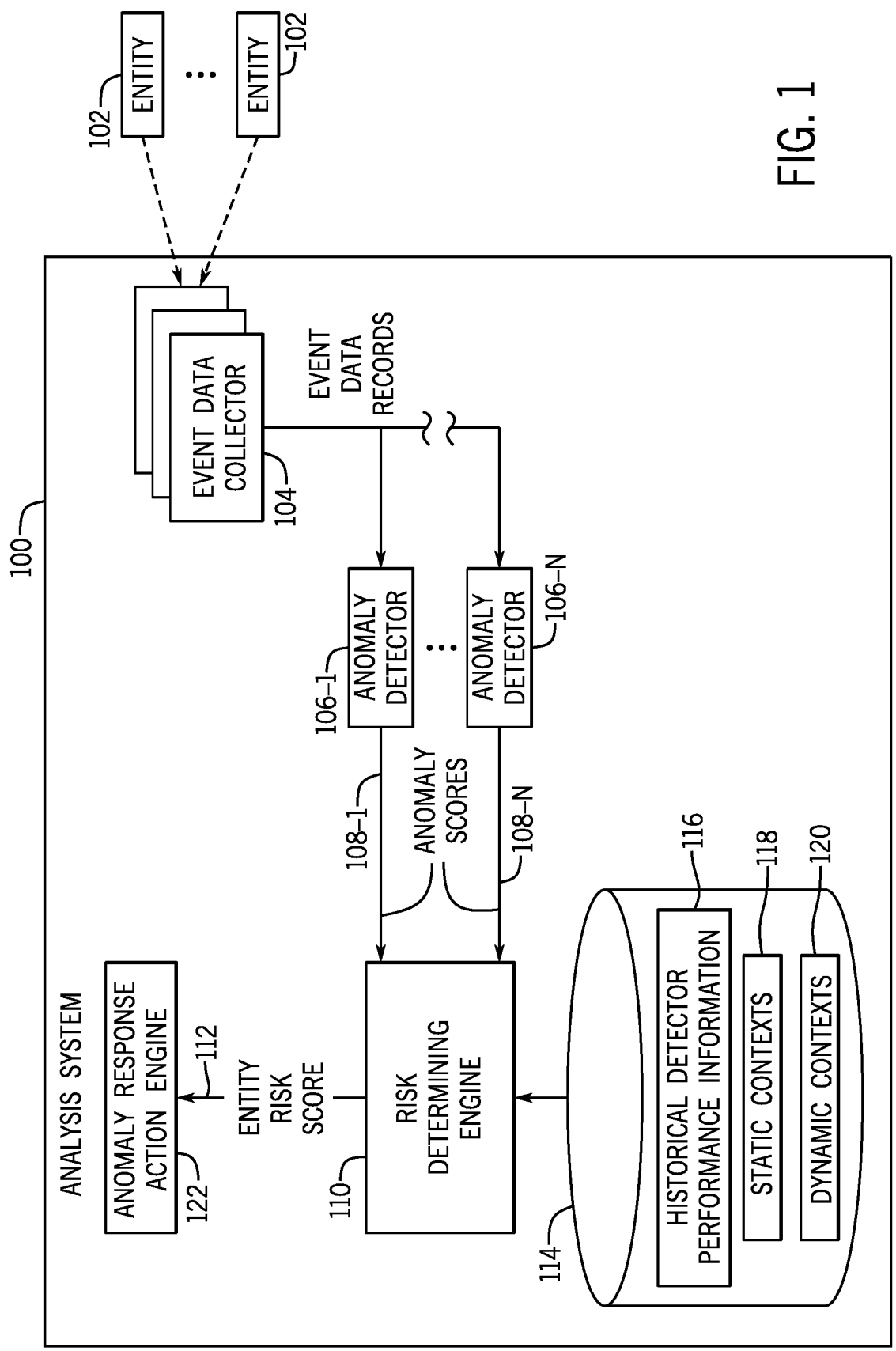
FIG. 1 is a block diagram of a computing environment including an analysis system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Certain behaviors of entities in a computing environment can be considered anomalous. Examples of entities can include users, machines (physical machines or virtual machines), programs, sites, network addresses, network ports, domain names, organizations, geographical jurisdictions (e.g., countries, states, cities, etc.), or any other identifiable element that can exhibit a behavior including actions in the computing environment. A behavior of an entity can be anomalous if the behavior deviates from an expected rule, criterion, threshold, policy, past behavior of the entity, behavior of other entities, or any other target, which can be predefined or dynamically set. An example of an anomalous behavior of a user involves the user making greater than a number of login attempts into a computer within a specified time interval, or a number of failed login attempts by the user within a specified time interval. An example of an anomalous behavior of a machine involves the machine receiving greater than a threshold number of data packets within a specified time interval, or a number of login attempts by users on the machine that exceed a threshold within a specified time interval.

Analysis can be performed to identify anomalous entities, which may be entities that are engaging in behavior that present a risk to a computing environment. In some examples, such analysis can be referred to as a User and Entity Behavior Analysis (UEBA). As examples, a UEBA system can use behavioral anomaly detection to detect a compromised user, a malicious insider, a malware infected device, a malicious domain name or network address (such as an Internet Protocol or IP address), and so forth.

In some cases, risk scores can be assigned to profiles of entities, where a profile includes a representation of a behavior of the entity over a time period. In response to the risk scores, an analyst is able to perform investigations, or alerts can be produced. However, if the risk scores are unreliable, then a large number of false alerts can be generated, particularly in a large computing environment with a large number of entities. False alerts can cause analysts to waste time on issues that are not really anomalous, and may in fact cause analysts to miss real issues associated with entities exhibiting anomalous behavior.

In accordance with some implementations of the present disclosure, a risk score can be computed based on a combination of various factors: anomalous scores from multiple detectors, weights assigned to the detectors, and impacts determined based on contexts (e.g., static context and/or dynamic context) of the entity. As used here, a risk score can refer to a measure of risk that an entity can present to a computing environment if the entity were exhibiting anomalous behavior. A risk to a computing environment can refer to damage, error, loss, or any other compromise of the computing environment or a portion of the computing environment. The risk score derived from the foregoing factors can produce a more reliable indication of risk than other example techniques.

A risk score can refer to any indication or measure of respective different amounts of risk. In some examples, a risk score can refer to a numerical value that is from a range of possible numerical values indicating different amounts of risk to a computing environment. In other examples, a risk score can refer to a categorical value that can be selected from among multiple possible categories (e.g., low, medium, high) for indicating different levels of risk to a computing environment. In further examples, a risk score can refer to a binary risk indication that can be set to a low state or high state (where a low state refers to no risk and a high state refers to presence of risk).

FIG. 1 is a block diagram of an example arrangement that includes an analysis system 100 and a number of entities 102, where the entities 102 can include any of the entities noted above. In some examples, the entities 102 can be part of an organization, such as a company, a government agency, an educational organization, or any other type of organization. In other examples, the entities 102 can be part of multiple organizations. The analysis system 100 can be operated by an organization that is different from the organization(s) associated with the entities 102. In other examples, the analysis system 100 can be operated by the same organization associated with the entities 102.

In some examples, the analysis system 100 can include a UEBA system. In other examples, the analysis system 100 can include an Enterprise Security Management (ESM) system, which provides a security management framework that can create and sustain security for a computing infrastructure of an organization. In other examples, other types of analysis systems 100 can be employed.

The analysis system 100 can be implemented as a computer system or as a distributed arrangement of computer systems. More generally, the various components of the analysis system 100 can be integrated into one computer system or can be distributed across various different computer systems.

In some examples, the entities 102 can be part of a computing environment, which can include computers, communication nodes (e.g., switches, routers, etc.), storage devices, servers, and/or other types of electronic devices. The computing environment can also include additional entities, such as programs, users, network addresses assigned to entities, domain names of entities, and so forth. The computing environment can be a data center, an information technology (IT) infrastructure, a cloud system, or any other type of arrangement that includes electronic devices and programs and users associated with such electronic devices and programs.

The analysis system 100 includes event data collectors 104 to collect data relating to events associated with the entities 102 of the computing environment. The event data collectors 104 can include collection agents (in the form of machine-readable instructions such as software or firmware modules, for example) distributed throughout the computing environment, such as on computers, communication nodes, storage devices, servers, and so forth. Alternatively, some of the event data collectors 104 can include hardware event collectors implemented with hardware circuitry.

The event data collectors 104 can output event data records, which can either be stored into a log for later analysis or can be provided in real time to anomaly detectors 106-1 to 106-N (N≥2). An event data record can refer to any collection of information that can include information pertaining to a respective event.

Examples of events can include login events (e.g., events relating to a number of login attempts and/or devices logged into), events relating to access of resources such as websites, events relating to submission of queries such as Domain Name System (DNS) queries, events relating to sizes and/or locations of data (e.g., files) accessed, events relating to loading of programs, events relating to execution of programs, events relating to accesses made of components of the computing environment, errors reported by machines or programs, events relating to performance monitoring of various characteristics of the computing environment (including monitoring of network communication speeds, execution speeds of programs, etc.), and/or other events.

An event data record can include various attributes, such as a time attribute (to indicate when the event occurred), and further attributes that can depend on the type of event that the event data record represents. For example, if an event data record is to present a login event, then the event data record can include a time attribute to indicate when the login occurred, a user identification attribute to identify the user making the login attempt, a resource identification attribute to identify a resource in which the login attempt was made, and so forth.

The anomaly detectors 106-1 to 106-N can analyze the event data records to determine whether any entity 102 is exhibiting anomalous behavior, which would make such entity an anomalous entity. The determination of whether an entity is an anomalous entity can be based on a profile of the entity. A profile includes information that represents a behavior of an entity over a specified time period. The representation of the entity's behavior can include a number of features that correspond to the entity's behavior, such as a number of website accesses, a number of DNS queries, a number of times login was attempted, a number of devices logged into, sizes of files accessed, locations of files accessed, programs invoked, and so forth. Although examples of features of a profile are given, it is noted that in other examples, additional or alternative features can be included in a profile. Generally, a "profile" can refer to any information that represents a behavior of an entity.

The anomaly detectors 106-1 to 106-N can be different types of anomaly detectors that apply respective different anomaly detection techniques. For example, the anomaly detector 106-1 can apply a first type of anomaly detection technique that is based on features of a profile of an entity, while the anomaly detector 106-N can apply a second type of anomaly detection technique that is based on a graph representing interactions among entities.

Given the features in the profile of an entity, the feature-based anomaly detection technique applied by the anomaly detector 106-1 can determine whether the entity is exhibiting anomalous behavior. For example, the feature-based anomaly detection technique can be based on application of a classifier, which is learned according to historical data relating to entities. The historical data can include profiles of various entities, and can include information pertaining to whether such profiles resulted in a correct labelling of the profiles as exhibiting anomalous behavior. More specifically, a classifier can be trained (learned) based on training information, where the training information can include profiles and labels assigned to indicate whether or not each profile is associated with anomalous behavior. In other examples, a feature-based anomalous detection technique can apply a rule (or a set of rules) based on expert domain knowledge to determine whether a set of features of a profile indicates an anomalous behavior.

In other examples, a feature-based anomaly detection technique can apply time series analysis to determine whether a feature of a profile indicates anomalous behavior.

A graph-based anomalous detection technique uses a graph representing entity behavior. The graph can include an arrangement of nodes and links between such nodes. Each node can represent a respective entity, and a link between nodes can indicate interaction among the entities. For example, a link between a user and a computer (represented by respective nodes of the graph) can indicate that the user is logged into or has attempted a login to the computer. Historical data can be used to learn normal behaviors of nodes in the graph, e.g., the number of neighboring nodes, degree distribution of nodes, eigenvalues, and page rank. Any deviation from normal behavior over time will indicate anomalous behavior.

In further examples, the anomaly detectors 106-1 to 106-N can apply other anomaly detection techniques.

Based on the detection performed by the anomaly detectors 106-1 to 106-N, the anomaly detectors 106-1 provide respective anomaly scores 108-1 to 108-N to a risk determining engine 110. An anomaly score 108 (any one of the anomaly scores 108-1 to 108-N) can include information that indicates whether or not an entity (or more specifically, a profile of the entity) is exhibiting anomalous behavior. An anomaly score 108 can include a binary value, such as in the form of a flag or other type of indicator, that when set to a first state (e.g., "1") indicates an anomalous behavior, and when set to a second state (e.g., "0") indicates normal behavior (i.e., non-anomalous behavior). In further examples, an anomaly score 108 can include a numerical value that indicates a likelihood of anomalous behavior. For example, the anomaly score can range in value between 0 and 1, where 0 indicates with certainty that the entity is not exhibiting anomalous behavior, and a 1 indicates that the entity is definitely exhibiting anomalous behavior. Any value that is greater than 0 or less than 1 provides an indication of the likelihood, based on the confidence of the respective anomaly detector 106 (any one of anomaly detectors 106-1 to 106-N) that produced the anomaly score. In other examples, an anomaly score that ranges in value between 0 and 1 can also be referred to as a likelihood score. In other examples, instead of ranging between 0 and 1, an anomaly score can have a range of different values to provide indications of different confidence amounts of the respective anomaly detector 106 in producing the anomaly score 108. In further examples, an anomaly score 108 can be a categorical value that is assigned to different categories (e.g., low, medium, high).

The risk determining engine 110 is to determine a risk associated with a corresponding entity based on a received anomaly score (or multiple anomaly scores) corresponding to the entity. As used here, an "engine" can refer to a hardware processing circuit or a combination of a hardware processing circuit and machine-readable instructions (e.g., software and/or firmware) executable on the hardware processing circuit. The hardware processing circuit can include any or some combination of the following: a microprocessor, a core of a multi-core microprocessor, a microcontroller, a programmable gate array, a programmable integrated circuit device, and so forth.

The risk determining engine 110 produces an entity risk score 112 for a particular entity based on multiple factors, including the anomaly scores 108-1 to 108-N pertaining to the particular entity, and other factors, including historical data and a context (or multiple contexts) of the particular entity, which may be stored in an information repository 114. The information repository 114 can include a storage system (or multiple storage systems), where a storage system can include a disk-based storage device (or multiple disk-based storage devices) and/or a solid-state memory device (or multiple solid-state memory devices).

In some examples, the information repository 114 includes historical detector performance information 116, which can provide information relating to historical performance of each of the anomaly detectors 106-1 to 106-N. For example, the historical detector performance information 116 can include accuracy information indicating, for each anomaly detector, how accurate the anomaly detector was in performing anomaly detection in the past. If an anomaly detector produced a large number of false positives, then the accuracy information can provide an indication that the anomaly detector is not accurate because it has produced a high percentage of false positives. As another example, an anomaly detector can produce a large percentage of false negatives, which means that the anomaly detector did not successfully detect an anomalous entity. The accuracy information in such a case can indicate that such an anomaly detector is associated with a large number of false negatives. In some examples, the accuracy information can include different accuracy measures to indicate different levels or amounts of accuracy.

The accuracy information for each anomaly detector can also indicate accuracies at different time instances in the past. For example, at a more distant time instance, a given anomaly detector may be less accurate; however, at a more recent time instance, the given anomaly detector may be more accurate, such as due to the given anomaly detector learning based on past predictions.

Based on the accuracy information for the respective anomaly detectors 106-1 to 106-N, weights can be assigned by the risk determining engine 110 to the corresponding anomaly detectors 106-1 to 106-N. A weight assigned to an anomaly detector can be proportional to the accuracy of the anomaly detector—in other words, the greater the accuracy, the higher the weight. In some examples, a weight assigned to an anomaly detector can range in value between 0 and 1. In other examples, other weight values can be used.

Although accuracy is an example of a performance of an anomaly detector, other types of parameters can be used to indicate the performance of the anomaly detector. For example, another parameter is an efficiency parameter, which indicates how quickly or how efficiently (from a processing resource usage, storage resource usage, or network resource perspective) an anomaly detector is in detecting an anomaly and computing an anomaly score. If a first anomaly detector can compute an anomaly score more quickly (or uses less processing, storage, or network resources) than a second anomaly detector, then the first anomaly detector can be assigned a higher efficiency parameter than the second anomaly detector.

The risk determining engine 110 produces a weighted anomaly score for a given entity based on the anomaly scores 108-1 to 108-N (received from the anomaly detectors 106-1 to 106-N, respectively, for the given entity), and the weights that are assigned to the anomaly detectors 106-1 to 106-N based on historical performance of the anomaly detectors, as indicated by the historical detector performance information 116. The weighted anomaly score can be a weighted sum of the anomaly scores 108-1 to 108-N, such as according to the following:

$$\text{Weighted\_Anomaly\_Score} = \Sigma_{i=1}^{N} w_i \cdot \text{Anomaly\_Score}_i, \quad \text{(Eq. 1)}$$

where $\text{Anomaly\_Score}_i$ is the anomaly score from anomaly detector 108-$i$ ($i=1$ to N), $w_i$ represents the weight assigned to the anomaly detector 108-$i$, and Weighted_Anomaly_Score represents the weighted anomaly score produced by the risk determining engine 110.

In other examples, instead of computing a weighted sum to produce the weighted anomaly score, the risk determining engine 110 can compute the weighed anomaly score using a different mathematical aggregation of the anomaly scores and corresponding weights.

The information repository 114 can also store static contexts 118 for the respective entities 102, as well as dynamic contexts 120 for the respective entities 102. A static context 118 can include static attributes of an entity that have values that generally do not change with different settings of an entity, where the different settings of the entity can refer to different times, different locations (e.g., geographic locations, locations in a building, etc.), and so forth. Although static attributes of a static context 118 generally do not change with different settings, it is noted that in some examples, a value of a static attribute can be updated, such as by an administrator on an infrequent basis or to perform maintenance or system updates.

Examples of static attributes of a static context for a user can include any or some combination of the following: a job role of the user, a designation of a user, an organization that the user is part of, a home location of the user, and so forth. Examples of static attributes of a static context for a machine can include any or some combination of the following in attributes: a type of the machine (e.g., an endpoint device or a data center server), a home location of the machine, a primary owner of the machine, and so forth.

On the other hand, a dynamic context 120 can include dynamic attributes of an entity that change value with different settings (e.g., times, locations, etc.) of the entity. For example, a dynamic attribute in the dynamic context 120 can have first value at a first time, and a different second value at a different second time. Alternatively, a dynamic attribute of the dynamic context 120 can have a first value in a first geographic location, and a different second value in a second geographic location. As a more specific example, when a user is at a first geographic location (such as when the user is at the office), the user has access to a particular resource. However, if a user is at a second, different geographic location (such as when the user is outside the office), the user does not have access to that particular resource. As another example, a user is permitted to log into a computer at a first time (e.g., during business hours), but is not permitted to log into the computer at a different second time (e.g., outside of business hours).

Examples of dynamic attributes in a dynamic context for a user can include any or some combination of the following: the current projects of the user, the current information access of the user (e.g., which files the user has permission to access), a current travel itinerary of the user, the user's current location, devices currently owned and logged into by the user, devices currently managed for the user, and so forth. Examples of dynamic attributes that can be included in a dynamic context for a machine can include any or some combination of the following: a current location of the machine, a current IP address of the machine, a number of users currently logged into the machine, whether the machine is connected over a virtual private network, and so forth.

The risk determining engine 110 further determines an impact based on a context of the given entity. An impact can refer to an effect that the entity would have on a computing environment if the entity were to exhibit anomalous behavior. For example, a user in a sensitive role (e.g., an executive officer of a company, a chief information technology officer of the company, etc.) if compromised would have a larger impact on the computing environment than another user whose role is less sensitive (such as a user who takes customer service calls). The effect that an entity can have on a computing environment can refer to issues, problems, or other adverse consequences that may be caused by the entity if exhibiting anomalous behavior.

The impact can be indicated using an impact score, which provides an indication of an amount or level of the impact. The impact score can be a measure that can be set to any one of multiple numerical values or any one of multiple categorical values. Alternatively, the impact score can be a binary indication to indicate that the entity either has no impact or has an adverse impact if the entity were to exhibit anomalous behavior.

The impact determined on a context of the given entity can be a first impact (e.g., represented using a first impact score) based on the static context of the given entity, and a second impact (e.g., represented using a first impact score) based on a dynamic context of the given entity.

The entity risk score 112 for a given entity that is computed by the risk determining engine 110 can thus be based on the weighted anomaly score that is produced based on the anomaly scores 108-1 to 108-N and weights assigned by the risk determining engine 110 based on the historical detector performance information 116, and also on the determined impact (or impacts) corresponding to the context (s) of the given entity.

The entity risk score 112 can be sent by the risk determining engine 110 to an anomaly response action engine 122. The anomaly response action engine 122 is able to take any action in response to the entity risk score 112. In some examples, the anomaly response action engine 122 can generate an alert if the entity risk score 112 exceeds a specified threshold. The alert can be sent to a security operation center (SOC) that protects the computing environment from security issues. An SOC can refer to any organization or infrastructure that is responsible for protecting the computing environment in response to security issues or other issues. In an SOC, analysts may monitor for alerts relating to security or other issues in the computing environment, and in response to the alerts, can take actions to address the security or other issues.

In further examples, the entity risk score 112 can be used in prioritizing entity profiles for investigation by an analyst—for example, an entity with a higher entity risk score can be investigated by the analyst (or a machine or program) ahead of another entity with a lower entity risk score.

In other examples, the anomaly response action engine 122 can perform automated actions to address an issue relating to an anomalous entity. For example, the anomaly response action engine 122 can automatically disable access by the entity 102 of certain resources in response to detecting that the entity risk score 112 for the entity has exceeded a specified threshold. In this way, the anomaly response action engine 122 is able to protect a computing environment from anomalous behaviors of entities to prevent secured information from being compromised or accessed by non-authorized entities, to protect the computing environment from errors or faults caused by anomalous behaviors of entities, and so forth.

Figure 2:
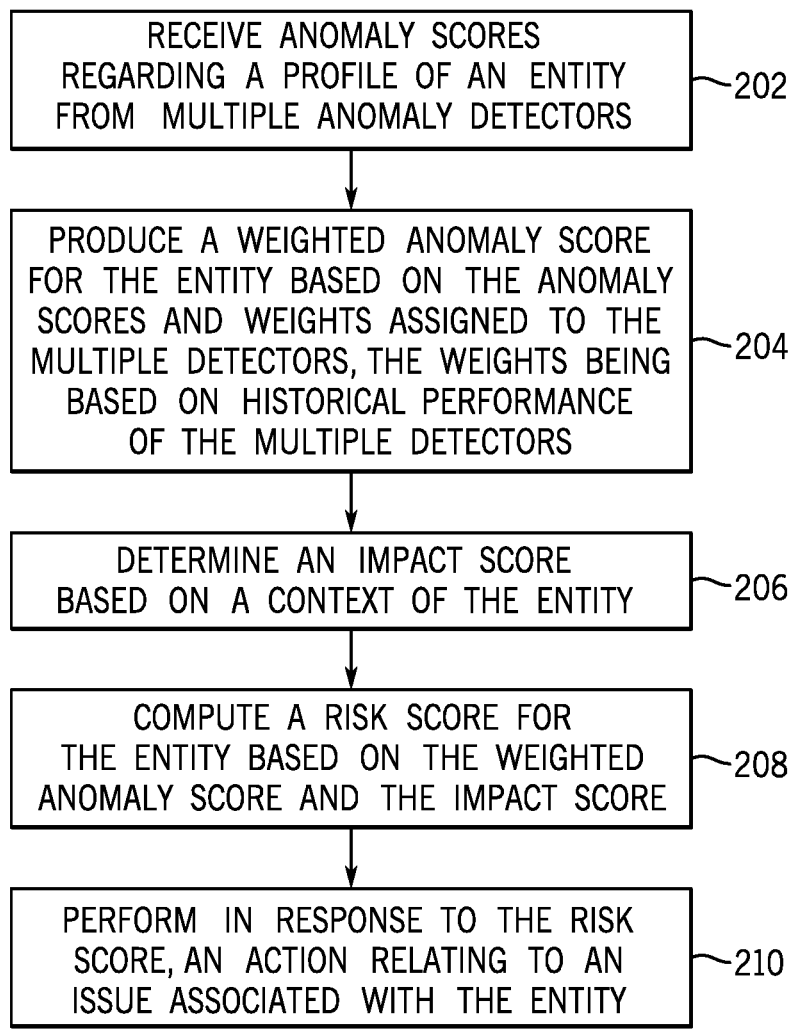
FIGS. 2 and 3 are flow diagrams of processes according to various examples.

FIG. 2 is a flow diagram of a process of the analysis system 100 according to some examples. The risk determining engine 110 receives (at 202) anomaly scores (e.g., 108-1 to 108-N in FIG. 1) regarding a profile of an entity from multiple anomaly detectors. The anomaly scores can be part of the anomaly scores provided by the anomaly detectors 106-1 to 106-N of FIG. 1.

The risk determining engine 110 produces (at 204) a weighted anomaly score for the entity based on the anomaly scores and respective weights assigned to the multiple anomaly detectors, the weights being based on historical performance of the multiple anomaly detectors (e.g., derived from the historical detector performance information 116 of FIG. 1).

In some examples, the weights assigned to the anomaly detectors can be based on historical performance of the anomaly detectors that is specific to the given entity under consideration. Alternatively, the weights that are computed can be based on the performance of the anomaly detectors for multiple entities in the past. In some examples, the weight assigned to a detection of an anomaly detector is a measure of the average number of times the anomaly detector has been correct in the past. Moreover, the anomaly detections performed by anomaly detectors can have occurred a number of times in the past. Greater weight can be assigned to more recent detections by an anomaly detector than an anomaly detection performed by the anomaly detector further in the past. The notion here is that the more recent anomaly detections may be more reflective of the performance of the anomaly detector, which may have learned to produce better anomaly detections over time.

The risk determining engine 110 further determines (at 206) an impact score based on a context of the entity, where the context can include a static context or a dynamic context. In some examples, the risk determining engine 110 can determine multiple impact scores based on the respective static and dynamic context of the entity.

The risk determining engine 110 computes (at 208) a risk score (e.g., the entity risk score 112 of FIG. 1) for the entity based on the weighted anomaly score and the impact score. In addition, the anomaly response action engine 122 performs (at 210), in response to the risk score, an action relating to an issue associated with the entity.

Figure 3:
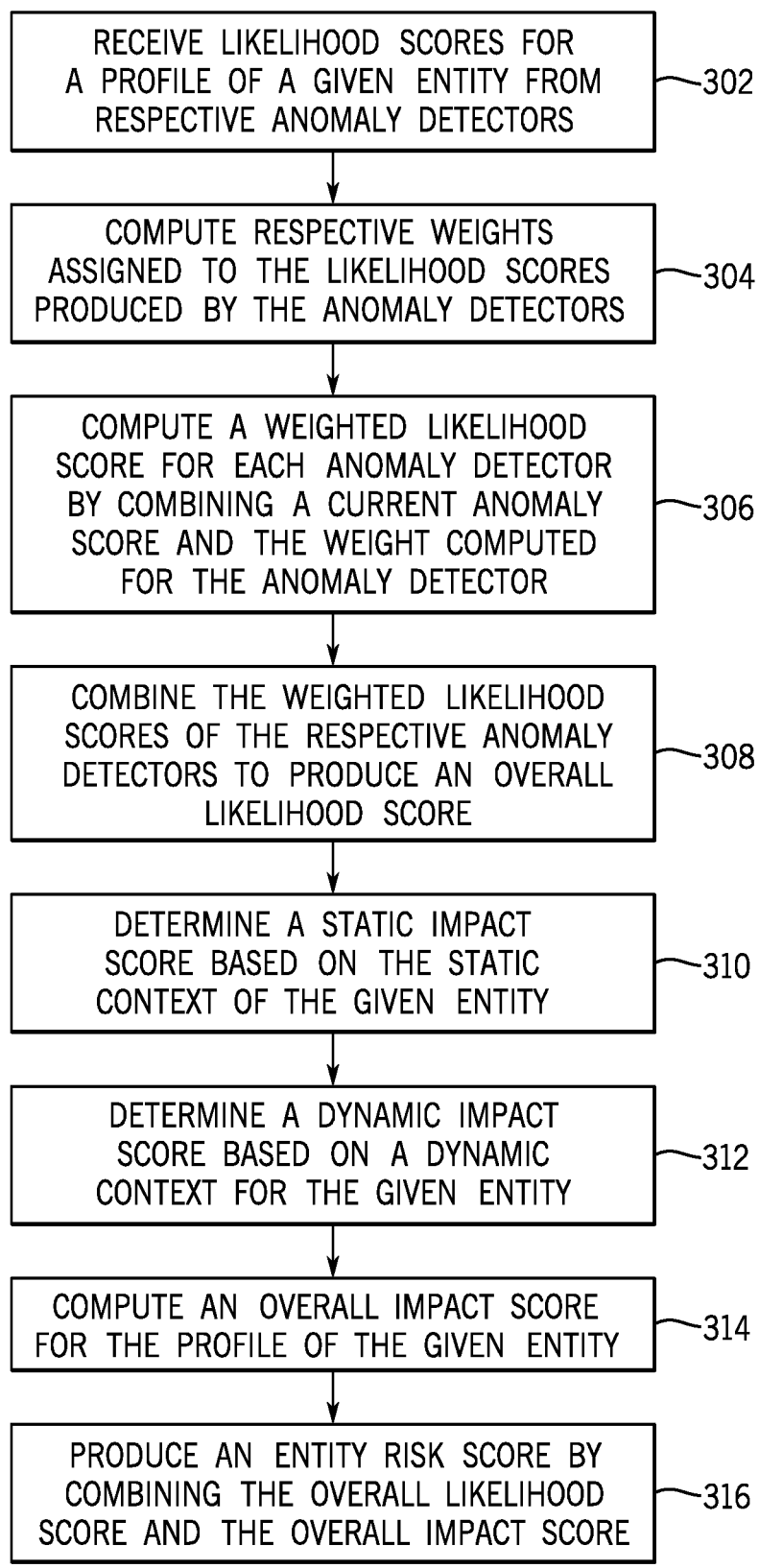

FIG. 3 is a flow diagram of a process of the analysis system 100 according to further examples. The risk determining engine 110 receives (at 302) likelihood scores for a profile of a given entity from respective anomaly detectors. In some examples, the likelihood scores are examples of anomaly scores, where each likelihood score can have values in the range between 0 and 1 (inclusive of 0 and 1) assigned to the respective detections of anomalous behavior by the corresponding anomaly detectors. A likelihood score reflects a confidence in the detection of the anomalous behavior by the respective anomaly detector.

For a given entity or a given profile of the entity, the different anomaly detectors 106-1 to 106-N can have different performance in detecting an anomaly. Some anomaly detectors may have a higher level of performance (e.g., more accurate, more reliable, consumes less processing, storage, or network resource, etc.) than other anomaly detectors under specific scenarios. As a result, the risk determining engine 110 computes (at 304) respective weights assigned to the likelihood scores produced by the anomaly detectors 106-1 to 106-N.

The risk determining engine 110 computes (at 306) a weighted likelihood score for each anomaly detector by combining a current anomaly score (108) and the weight computed (at 304) for the anomaly detector. In some examples, the anomaly score (108) can be multiplied with the weight. In other examples, the weight for the anomaly detector can be used as a filter to ignore an anomaly detection from the anomaly detector if the weight is less than a specified threshold. However, if the weight for the anomaly detector is greater than or equal to the threshold, then the anomaly detection (and more specifically, the anomaly score from the anomaly detector) can be used for producing the weighted likelihood score.

In some examples, the weighted likelihood score can be in the range of 0 to 1 for each anomaly detector. In other examples, other values of a weighted likelihood score can be produced.

The risk determining engine 110 combines (at 308) the weighted likelihood scores of the respective anomaly detectors to produce an overall likelihood score, which can also be in the range between 0 and 1 (or in another range of values). Various example manners of producing the overall likelihood score can be performed. For example, an aggregate of the weighted likelihood scores for the respective anomaly detectors can be computed, where the aggregate can be a mathematical aggregate such as an average of the weighted likelihood scores, a maximum of the weighted likelihood scores, a harmonic mean of the weighted likelihood scores, a weighted average of the weighted likelihood scores, and so forth. In other examples, a function or classifier can be applied to the weighted likelihood scores to produce the overall likelihood score. The function or classifier may have been trained based on past data. As a further example, a rule (or a set of rules) can be applied to the weighted likelihood scores to generate the overall anomaly score. For example, if the combination of the weighted likelihood scores satisfies the rule (or set of rules), then a first overall likelihood score can be output. On the other hand, if the combination of the weighted likelihood scores does not satisfy the rule (or set of rules), then a different second overall likelihood score can be output.

The risk determining engine 110 further determines (at 310) a static impact score based on the static context of the given entity. The static impact score can be computed based on the static attributes of the static context using any of a number of different techniques. For example, a domain expert, such as an SOC analyst or any other person with special knowledge or training regarding impacts of different attributes of an entity on a computing environment, may assign a static impact score to each static attribute, and possibly, a weight for the static attribute. The static impact score can be a weighted average of the analyst assigned scores (assigned to the respective static attributes), where the weighted average can be produced by the risk determining engine 110 (by averaging values each produced based on a product of a respective static impact score and the respective weight). A different technique involves learning (such as by a classifier) the static impact scores and weights from historical data collected from one enterprise or from an entire industry. For example, the analyst system 100 can collect data from customers and then use such data from customers as part of a machine learning process.

The risk determining engine 110 further determines (at 312) a dynamic impact score based on a dynamic context for the given entity. As noted above, dynamic attributes of the dynamic contexts of an entity can change for different settings. For example, a user can have access to different information at different times based on the user's involvement in different projects. Alternatively, a user may be travelling and presenting to a customer, in which case compromising the user's account may have a severe impact on the enterprise.

The dynamic impact score can be computed as a weighted average of dynamic impact scores assigned to the respective dynamic attributes. The dynamic impact scores and weights can be assigned by domain experts or can be learnt from historical data.

The risk determining engine 112 computes (at 314) an overall impact score for the profile of the given entity, where the overall impact score can be in the range of 0 to 1 or can be from a different range of values. In some examples, the overall impact score can be a weighted combination (e.g., weighted sum or other mathematical aggregate) of the static impact score and the dynamic impact score. In the absence of any weights assigned to the static and dynamic impact scores, the overall impact score can be an average (or some other mathematical aggregate) of the static and dynamic impact scores. Alternatively, weights can be assigned to the respective static and dynamic impact scores, where the weights can be assigned by domain experts or can be learnt (by a classifier) from historical data collected over time.

The risk determining engine 110 then produces (at 316) an entity risk score (e.g., 112 in FIG. 1) by combining the overall likelihood score and the overall impact score. For example, the combining can be a sum of the overall likelihood score and the overall impact score, a weighted sum of the overall likelihood score and the overall impact score (based on a weight assigned to each of the overall likelihood score and the overall impact score), or some other mathematical aggregate (e.g., multiplication, harmonic mean, maximum, minimum, etc.) of the overall likelihood score and the overall impact score. In some examples, the entity risk score can be in the range between 0 and 1, or can be in a different range of numbers.

Figure 4:
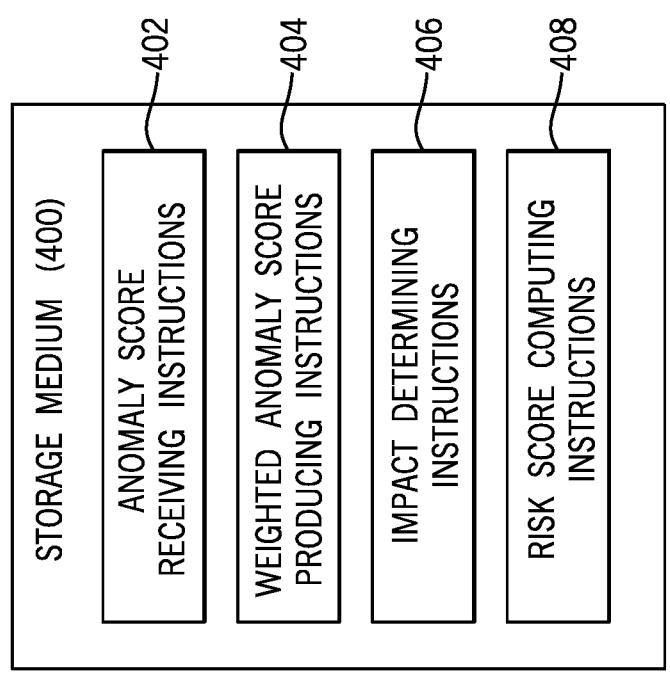
FIG. 4 is a block diagram of a storage medium storing machine-readable instructions according to some examples.

FIG. 4 is a block diagram of a non-transitory machine-readable or computer-readable storage medium 400 storing instructions that upon execution cause a system to perform various tasks. The machine-readable instructions can include anomaly score receiving instructions 402 to receive anomaly scores regarding an entity from multiple anomaly detectors. The machine-readable instructions further include weighted anomaly score producing instructions 404 for producing a weighted anomaly score for the entity based on the anomaly scores and weights assigned to the multiple detectors based on historical performance of the multiple detectors. The machine-readable instructions further include impact determining instructions 406 to determine an impact based on a context of the entity. The machine-readable instructions further include risk score computing instructions 408 to compute a risk indication for the entity based on the weighted anomaly score and the determined impact.

Figure 5:
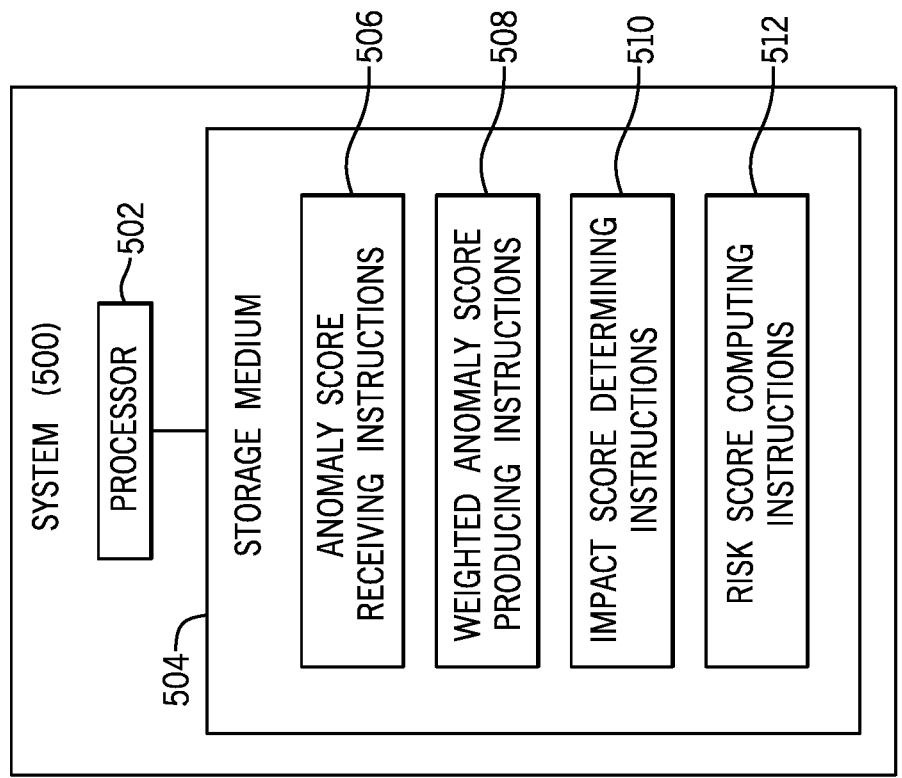
FIG. 5 is a block diagram of a system according to some examples.

FIG. 5 is a block diagram of a system 500 according to some examples. The system 500 can be implemented as a single computer system or as multiple computer systems. The system 500 includes a processor 502 (or multiple processors). A processor can include a microprocessor, microcontroller, processor module or subsystem, programmable integrated circuit, programmable gate array, or another control or computing device.

The system 500 further includes a storage medium 504 storing instructions that are executable on the processor to perform various tasks. Instructions executable on a processor can refer to instructions executable on one processor or instructions executable on multiple processors.

The instructions stored in the storage medium 504 include anomaly score receiving instructions 506 to receive anomaly scores regarding an entity from multiple detectors. The machine-readable instructions also include weighted anomaly score producing instructions to produce a weighted anomaly score for the entity based on the anomaly scores and weights assigned to the multiple detectors based on historical performance of the multiple detectors.

The machine-readable instructions further include impact score determining instructions (510) to determine impact scores for respective static and dynamic contexts of the entity. The machine-readable instructions further include risk score computing instructions (512) to compute a risk score for the entity based on combining the weighted anomaly score and the impact scores.

The storage medium 400 (FIG. 4) or 504 (FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:
   generate anomaly scores regarding a first entity using a plurality of different types of detectors that apply different anomaly detection techniques, wherein the different anomaly detection techniques comprise a first type of anomaly detection technique based on features of a profile of the first entity and a second type of anomaly detection technique based on a graph representing interactions among entities including an access by the first entity of a program, the profile of the first entity comprising features representing accesses of programs by the first entity that change over time;
   produce a weighted anomaly score for the first entity based on the anomaly scores and respective weights assigned to the plurality of different types of detectors, the respective weights based on an accuracy parameter and an efficiency parameter of the plurality of different types of detectors in performing past anomaly detections, the efficiency parameter representing an efficiency in usage of a processing resource by a respective detector of the plurality of different types of detectors;
   determine an impact based on a context of the first entity, wherein the impact is indicative of an effect that the first entity would have on a computing environment when the first entity exhibits an anomalous behavior; and
   compute a risk score for the first entity based on the weighted anomaly score and the determined impact.

2. The non-transitory machine-readable storage medium of claim 1, wherein the impact is represented by a static impact score based on a static context of the first entity, wherein the static context comprises a static attribute that does not vary with a change in a setting of the first entity, and wherein the instructions upon execution cause the system to further:
   determine a dynamic impact score based on a dynamic context of the first entity, the dynamic context comprising a dynamic attribute that changes with the change in the setting of the first entity, the dynamic attribute representing a number of users logged into the first entity,
   wherein the risk score is based on the weighted anomaly score, the static impact score, and the dynamic impact score.

3. The non-transitory machine-readable storage medium of claim 2, wherein the change in the setting comprises a change in time or a change in location.

4. The non-transitory machine-readable storage medium of claim 1, wherein the accuracy parameter of the plurality of different types of detectors is based on production of false positives or false negatives by the plurality of different types of detectors in performing the past anomaly detections.

5. The non-transitory machine-readable storage medium of claim 1, wherein a weight assigned to a first detector of the plurality of different types of detectors is proportional to an accuracy parameter of the first detector at a plurality of past time instances in performing past anomaly detections by the first detector.

6. The non-transitory machine-readable storage medium of claim 1, wherein producing the weighted anomaly score for the first entity based on the anomaly scores and the respective weights assigned to the plurality of different types of detectors comprises computing a value derived from at least one selected from among: aggregating the respective weights and the generated anomaly scores, applying a classifier to weighted scores computed for the plurality of different types of detectors to obtain an aggregate score, selecting a maximum of the weighted scores, or computing a harmonic mean of the weighted scores.

7. A system comprising:
a processor; and
a non-transitory storage medium storing instructions executable on the processor to:
generate anomaly scores regarding a first entity using a plurality of different types of detectors that apply different anomaly detection techniques, wherein the different anomaly detection techniques comprise a first type of anomaly detection technique based on features of a profile of the first entity and a second type of anomaly detection technique based on a graph representing interactions among entities including an access by the first entity of a program, the profile of the first entity comprising features representing accesses of programs by the first entity that change over time;
produce a weighted anomaly score for the first entity based on the anomaly scores and respective weights assigned to the plurality of different types of detectors, the respective weights based on an accuracy parameter and an efficiency parameter of the plurality of different types of detectors in performing past anomaly detections, the efficiency parameter representing an efficiency in usage of a processing resource by a respective detector of the plurality of different types of detectors;
determine impact scores for respective static and dynamic contexts of the first entity, each impact score of the impact scores being indicative of an effect that the first entity would have on a computing environment when the first entity exhibits an anomalous behavior; and
compute a risk score for the first entity based on combining the weighted anomaly score and the impact scores.

8. The system of claim 7, wherein the static context comprises a static attribute of the first entity that remains static for different settings of the first entity, and wherein the determined impact scores comprise a static impact score based on the static context.

9. The system of claim 8, wherein the dynamic context comprises a dynamic attribute of the first entity that changes for the different settings of the first entity, the dynamic attribute representing a number of users logged into the first entity, wherein the determined impact scores comprise a dynamic impact score based on the dynamic context, and wherein the instructions are executable on the processor to compute the risk score based on combining the weighted anomaly score, the static impact score, and the dynamic impact score.

10. The system of claim 8, wherein the dynamic context comprises dynamic attributes of the first entity that change for the different settings of the first entity, and wherein the determining of the impact scores for the dynamic context is based on impact scores assigned to the dynamic attributes by a domain expert or learned by a classifier based on historical data.

11. The system of claim 8, wherein the dynamic context comprises dynamic attributes of the first entity that change for the different settings of the first entity, and wherein the determining of the impact scores for the dynamic context is based on impact scores and respective weights assigned to the dynamic attributes by a domain expert or learned by a classifier based on historical data.

12. The system of claim 9, wherein the instructions are executable on the processor to:
combine the static impact score and the dynamic impact score to produce an overall impact score,
wherein the risk score for the first entity is based on the overall impact score.

13. The system of claim 12, wherein the combining of the static impact score and the dynamic impact score comprises computing a weighted aggregate of the static impact score and the dynamic impact score.

14. The system of claim 7, wherein the accuracy parameter of the plurality of different types of detectors is based on production of false positives or false negatives by the plurality of different types of detectors in performing the past anomaly detections.

15. A method comprising:
generating, by a system comprising a hardware processor, anomaly scores regarding a first entity using a plurality of different types of detectors that apply different anomaly detection techniques, wherein the different anomaly detection techniques comprise a first type of anomaly detection technique based on features of a profile of the first entity and a second type of anomaly detection technique based on a graph representing interactions among entities including an access by the first entity of a program, the profile of the first entity comprising features representing accesses of programs by the first entity that change over time;
producing, by the system, a weighted anomaly score for the first entity based on the anomaly scores and respective weights assigned to the plurality of different types of detectors, the respective weights based on an accuracy parameter and an efficiency parameter of the plurality of different types of detectors in performing past anomaly detections, the efficiency parameter representing an efficiency in usage of a processing resource by a respective detector of the plurality of different types of detectors;
determining, by the system, an impact score based on a context of the first entity, wherein the impact score is indicative of an effect that the first entity would have on a computing environment when the first entity exhibits an anomalous behavior;
computing, by the system, a risk score for the first entity based on the weighted anomaly score and the impact score; and
performing, by the system in response to the risk score, an action relating to an issue associated with the first entity.

16. The method of claim 15, wherein the action in response to the risk score is selected from among generating an alert, performing an automated response, or prioritizing entity profiles for investigation by an analyst.

* * * * *